(12) United States Patent
Jeon et al.

(10) Patent No.: US 8,902,384 B2
(45) Date of Patent: Dec. 2, 2014

(54) QUANTUM ROD LIGHT-EMITTING DISPLAY DEVICE

(71) Applicant: LG Display Co., Ltd., Seoul (KR)

(72) Inventors: Il Jeon, Seoul (KR); Kyung-Chan Kim, Paju-si (KR); Joong-Pill Park, Paju-si (KR); Moon-Bae Gee, Paju-si (KR); Sung-Hee Cho, Seoul (KR); Kyung-Kook Jang, Paju-si (KR); Kyung-Seok Jeong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/651,142

(22) Filed: Oct. 12, 2012

(65) Prior Publication Data

US 2013/0341588 A1    Dec. 26, 2013

(30) Foreign Application Priority Data

Jun. 26, 2012 (KR) .................. 10-2012-0068586

(51) Int. Cl.
*H01L 29/00* (2006.01)

(52) U.S. Cl.
USPC .................................... 349/71; 349/112

(58) Field of Classification Search
CPC ..... G02F 1/1335; G02F 1/174; G02F 1/0105; G02F 2201/086; G02F 2203/05; G02F 2203/30; G02F 2203/34; G02F 2202/36; H01L 33/06; H01L 29/00
USPC .......... 349/71, 112, 96, 97, 61, 231, 949, 89, 349/62, 65, 13; 257/79, 21, 22, 40, 51, 89, 257/E33.008; 977/774
See application file for complete search history.

(56) References Cited

U.S. PATENT DOCUMENTS

| | | | | |
|---|---|---|---|---|
| 5,966,112 A | * | 10/1999 | Katagiri et al. | 345/104 |
| 2010/0079704 A1 | * | 4/2010 | Cho et al. | 349/71 |
| 2010/0208172 A1 | * | 8/2010 | Jang et al. | 349/71 |
| 2010/0289001 A1 | * | 11/2010 | Kahen et al. | 257/13 |
| 2011/0089809 A1 | | 4/2011 | Noh | |

FOREIGN PATENT DOCUMENTS

| | | |
|---|---|---|
| KR | 10-2007-0107498 A | 11/2007 |
| KR | 10-2011-0041824 A | 4/2011 |
| KR | 10-2012-0001387 A | 1/2012 |
| KR | 10-2012-0061538 A | 6/2012 |
| KR | 10-2012-0065748 A | 6/2012 |
| KR | 10-2012-0047199 A | 5/2013 |
| WO | WO 2010/095140 A2 | 8/2010 |
| WO | WO 2012/059931 A1 | 5/2012 |

* cited by examiner

*Primary Examiner* — David Vu
*Assistant Examiner* — Mouloucoulaye Inoussa
(74) *Attorney, Agent, or Firm* — Birch, Stewart, Kolasch & Birch, LLP

(57) ABSTRACT

A quantum rod light-emitting display device according to an embodiment of the invention includes a display panel including a first substrate, a second substrate opposite to the first substrate, and a quantum rod layer disposed between the first substrate and the second substrate, wherein quantum rods in the quantum rod layer are arranged in one direction; a backlight unit provided under the display panel and configured to provide light to the display panel; and a short-wavelength pass filter film formed between the display panel and the backlight unit, and configured to transmit the light having a predetermined wavelength range.

14 Claims, 6 Drawing Sheets

BEFORE ELECTRIC FIELD IS APPLIED　　　AFTER ELECTRIC FIELD IS APPLIED

QUANTUM ROD LIGHT-EMITTING DISPLAY DEVICE

CROSS-REFERENCE TO RELATED APPLICATION

This application claims priority to and the benefit of Korean Patent Application No. 10-2012-0068586 filed in Republic of Korea on Jun. 26, 2012, the disclosure of which is hereby incorporated by reference in its entirety.

BACKGROUND OF THE INVENTION

1. Field of the Invention

Embodiments of the invention relate to a quantum rod light-emitting display device, and more particularly, to a quantum rod light-emitting display device capable of maximizing optical efficiency using a display panel including a quantum rod layer.

2. Discussion of the Related Art

In recent years, highly efficient flat panel displays (FPDs), which may be made ultrathin and lightweight, and which consumes less power, have been required in various fields.

Among these, a liquid crystal display (LCD) has been most widely used as a typical FPD.

As shown in FIG. 1, which is a schematic cross-sectional view of a typical LCD, an LCD 1 may include a liquid crystal (LC) panel 10 including first and second substrates, an alignment film, a color filter layer, and an LC layer; a backlight unit (BLU) 20 including a light source 21, a reflection plate 22, and a plurality of optical films 23; and upper and lower polarizers 31 and 32.

That is, the LCD 1 may need the plurality of optical films 23 and the polarizers 31 and 32 to display a gray level, and the color filter layer to provide colors.

Accordingly, while light emitted by the light source 21 of the BLU 20 is being transmitted through the plurality of optical films 23, the color filter layer, and the polarizer 31, most of the light is lost, thus causing a drop in light transmittance.

Assuming that the amount of light emitted by the light source 21 of the BLU 20 is 100, the final amount of light transmitted through the LCD 1 becomes about 5 to about 10. Thus, the LCD 1 has very low optical transmission efficiency. Accordingly, it is necessary to increase luminance of light emitted by the BLU 20. To increase the luminance of the light emitted by the BLU 20, power consumption should increase, and a large number of components are required during a fabrication process, thereby making it difficult to reduce fabrication cost.

To solve the above-described problems, an organic light emitting diode (OLED) that does not require additional polarizers, color filter layers, and optical films has been proposed.

The OLED is an element configured to emit light during recombination of electron-hole pairs formed by injecting charges into an organic emission layer (EML) formed between a cathode serving as an electron injection electrode and an anode serving as a hole injection electrode.

The OLED may be formed on a flexible substrate, such as a plastic substrate, have a good color sense due to a self-emission function, be driven at a lower voltage of about 10V or lower, and consume less power than an LCD.

However, in the OLED, organic emission materials forming the organic EML have greatly different lifetimes according to the color of light emitted by each of the organic emission materials. In particular, a blue emission material has a relatively short lifetime, which is shorter than the lifespan of a typical display device.

Accordingly, it is still necessary to develop an FPD that has high optical efficiency, as long a lifespan as an LCD, and may be driven with low power.

SUMMARY OF THE INVENTION

Accordingly, embodiments of the invention are directed to a display device that substantially obviates one or more of the problems due to limitations and disadvantages of the related art.

An object of the embodiments of the invention is to provide a display device that may be configured more simply than a conventional liquid crystal display (LCD) and exhibit low power consumption and high transmittance.

Another object of the embodiments of the invention is to provide a display device capable of maximizing efficiency of light emitted by a backlight unit (BLU).

Additional features and advantages of the embodiments of the invention will be set forth in the description which follows, and in part will be apparent from the description, or may be learned by practice of the embodiments of the invention. The objectives and other advantages of the embodiments of the invention will be realized and attained by the structure particularly pointed out in the written description and claims hereof as well as the appended drawings.

To achieve these and other advantages and in accordance with the purpose of the embodiments of the invention, as embodied and broadly described herein, a quantum rod light-emitting display device includes a display panel disposed including a first substrate, a second substrate opposite to the first substrate, and a quantum rod layer between the first substrate and the second substrate, wherein quantum rods in the quantum rod layer are arranged in one direction; a backlight unit provided under the display panel and configured to provide light to the display panel; and a short-wavelength pass filter film formed between the display panel and the backlight unit, and configured to transmit the light having a predetermined wavelength range.

It is to be understood that both the foregoing general description and the following detailed description are by example and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings.

To begin with, a quantum rod used in embodiments of the invention will be briefly described.

Figure 1:
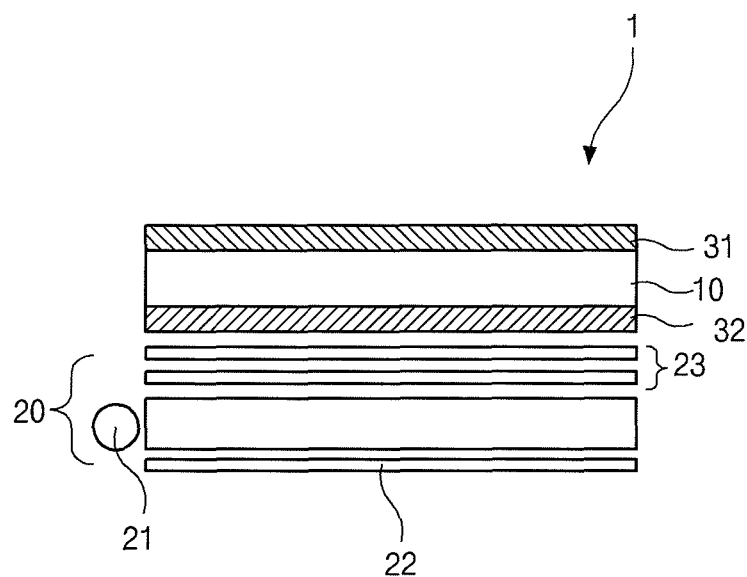
FIG. 1 is a schematic cross-sectional view of a related art liquid crystal display (LCD)
Figure 2:
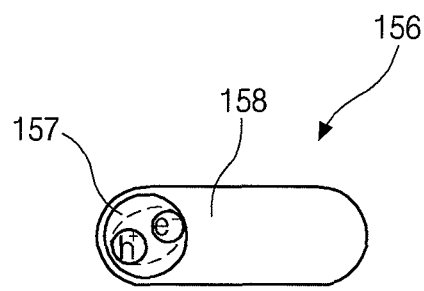
FIG. 2 illustrates a quantum rod according to an embodiment of the invention.

FIG. 2 illustrates a quantum rod according to an embodiment of the invention.

As shown in FIG. 2, a quantum rod 156 includes a core 157 forming a center portion of the quantum rod 156 and a shell 158 surrounding the core 157.

In an example embodiment of the invention, although the quantum rod 156 of FIG. 2 includes the core 157 and the shell 158 surrounding the core 157, the shell 158 may be omitted and the quantum rod 156 may include only the core 157.

Although FIG. 2 illustrates that the core 157 of the quantum rod 156 has a spherical shape, the core 157 may have any one of a spherical shape, an elliptical spherical shape, a polyhedral shape, and a rod shape. Other shapes may be used for the core 157. When the quantum rod 156 includes only the core 157 without the shell 158, the core 157 may have an elliptical spherical shape or a rod shape.

When the quantum rod 156 includes the core 157 and the shell 158 surrounding the core 157, the core 157 may have any one of a spherical shape, an elliptical spherical shape, a polyhedral shape, and a rod shape. Other shapes may be used for the shell 158. The shell 158 surrounding the core 157 may have a major axis and a minor axis. A cross-section in a direction of the minor axis of the quantum rod 156 may have any one of a circular shape, an elliptical shape, and a polyhedral shape. Other shapes may be used for the cross section of the shell 158.

The shell 158 may have a single layer structure or a multilayered structure and be formed of one of an alloy, an oxide-based material, and a doped material, or a mixture of at least two thereof.

In this instance, a ratio of the major axis of the shell 158 to the minor axis thereof may be in a range from 1:1.1 to 1:30.

Meanwhile, the core 157 of the quantum rod 156 may be formed of Group II-VI, III-V, III-VI, VI-IV, or IV semiconductor materials of the periodic table, alloys thereof, or mixtures thereof.

That is, when the core 157 of the quantum rod 156 is formed of Group II-VI elements, the core 157 of the quantum rod 156 may be formed of one of cadmium selenide (CdSe), cadmium sulfide (CdS), cadmium telluride (CdTe), zinc oxide (ZnO), zinc selenide (ZnSe), zinc sulfide (ZnS), zinc telluride (ZnTe), mercury selenide (HgSe), mercury telluride (HgTe), and cadmium zinc selenide (CdZnSe), or a mixture of at least two thereof.

In addition, when the core 157 of the quantum rod 156 is formed of Group III-V elements, the core 157 of the quantum rod 156 may be formed of one of indium phosphide (InP), indium nitride (InN), gallium nitride (GaN), indium antimony (InSb), indium arsenic phosphide (InAsP), indium gallium arsenide (InGaAs), gallium arsenide (GaAs), gallium phosphide (GaP), gallium antimony (GaSb), aluminum phosphide (AlP), aluminum nitride (AlN), aluminum arsenide (AlAs), aluminum antimony (AlSb), cadmium selenium telluride (CdSeTe), and zinc cadmium selenide (ZnCdSe), or a mixture of at least two thereof.

Furthermore, when the core 157 of the quantum rod 156 is formed of Group VI-IV elements, the core 157 of the quantum rod 156 may be formed of one of lead selenide (PbSe), lead telluride (PbTe), lead sulfide (PbS), lead tin telluride (PbSnTe), and thallium tin telluride ($Tl_2SnTe_5$), or a mixture of at least two thereof.

In the quantum rod 156 formed of the above-described materials, a ratio of the major axis to the minor axis ranges from about 1:1.1 to about 1:30. Even if the quantum rod 156 includes the core 157 formed of the same material, a wavelength of light fluoresced by the quantum rod 156 may vary according to a size of the core 157. That is, light having a shorter wavelength fluoresces with a reduction in the size (or diameter) of the core 157, while light having a longer wavelength fluoresces with an increase in the size (or diameter) of the core 157.

Accordingly, the quantum rods 156 according to the embodiment of the invention may control the size (or diameter) of the core 157 and provide light in almost all desired colors in the visible light range.

Figure 3:
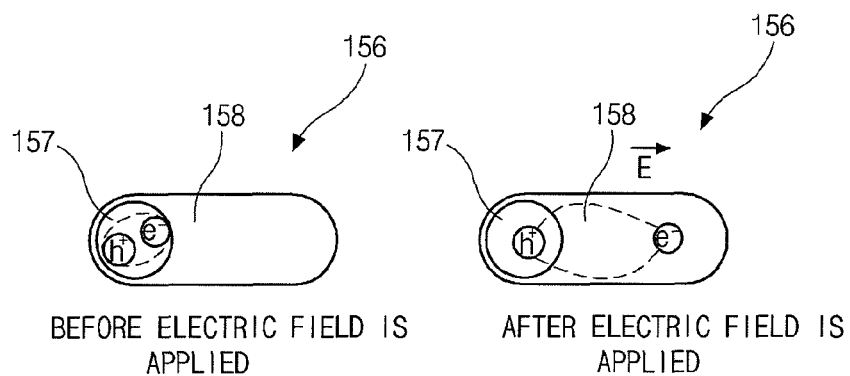
FIG. 3 illustrates states of electrons and holes before (electric-field off state) and after (electric-field on state) an electric field is applied to a quantum rod according to an embodiment of the invention.

FIG. 3 illustrates states of electrons and holes before (electric-field off state) and after (electric-field on state) an electric field is applied to a quantum rod according to an embodiment of the invention.

In the embodiment of the invention shown in FIG. 3, the shell 158 surrounding the core 157 has a major axis and a minor axis. In embodiments of the invention, the core 157 itself may have a major axis and a minor axis.

In this instance, before an electric field is applied in the direction of the major axis of the shell 158 or the core 157, electrons combine with holes in the core 157. However, once an electric field is applied in the direction of the major axis of the shell 158 or the core 157, electrons "e" are spatially separated from holes "h" within the core 157, or between the core 157 and the shell 158 to cause separation of bandgaps.

Thus, the intensity of an electric field may be controlled by adjusting an amount of fluorescent light generated by the quantum rod 156, thereby providing a gray level. Accordingly, since the quantum rod 156 according to the embodiment of the invention has a quantum yield of 100% in theory, the quantum rod 156 may generate fluorescent light at high intensity.

Hereinafter, construction of a quantum rod light-emitting display device according to an embodiment of the invention will be described in detail.

Figure 4:
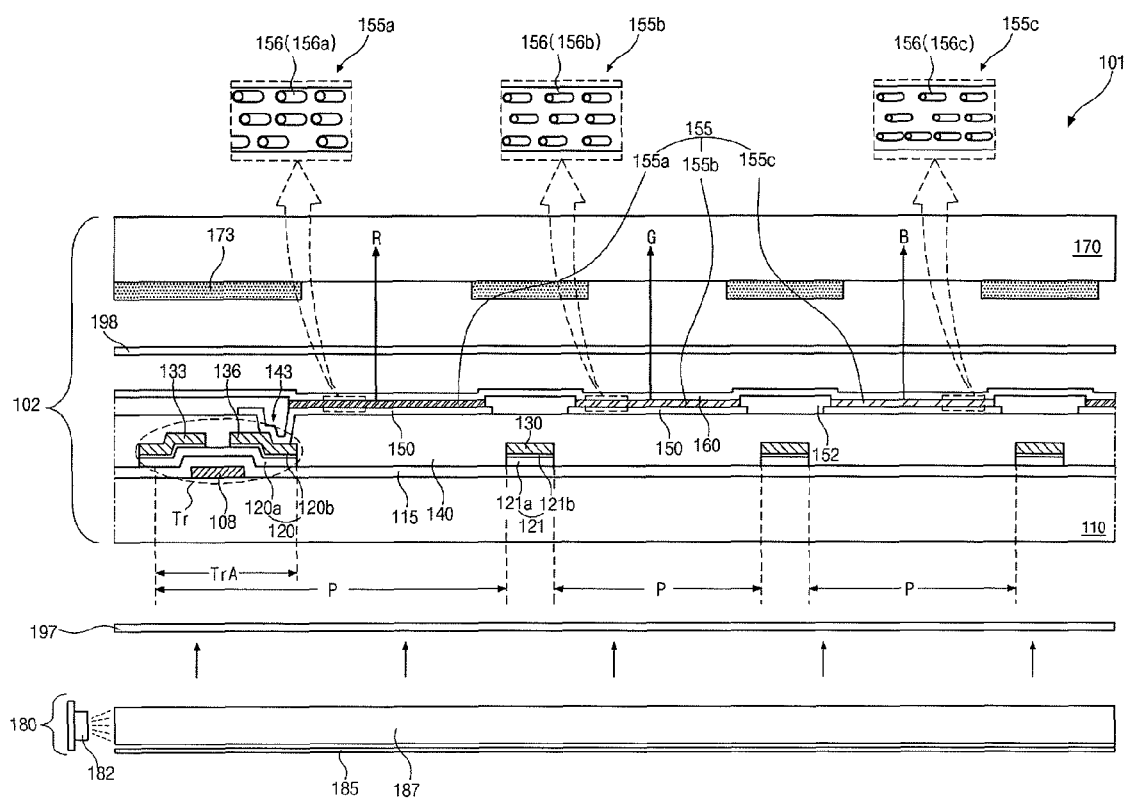
FIG. 4 is a cross-sectional view of a quantum rod light-emitting display device according to an embodiment of the invention.

FIG. 4 is a cross-sectional view of a quantum rod light-emitting display device according to an embodiment of the invention.

Figure 5A:
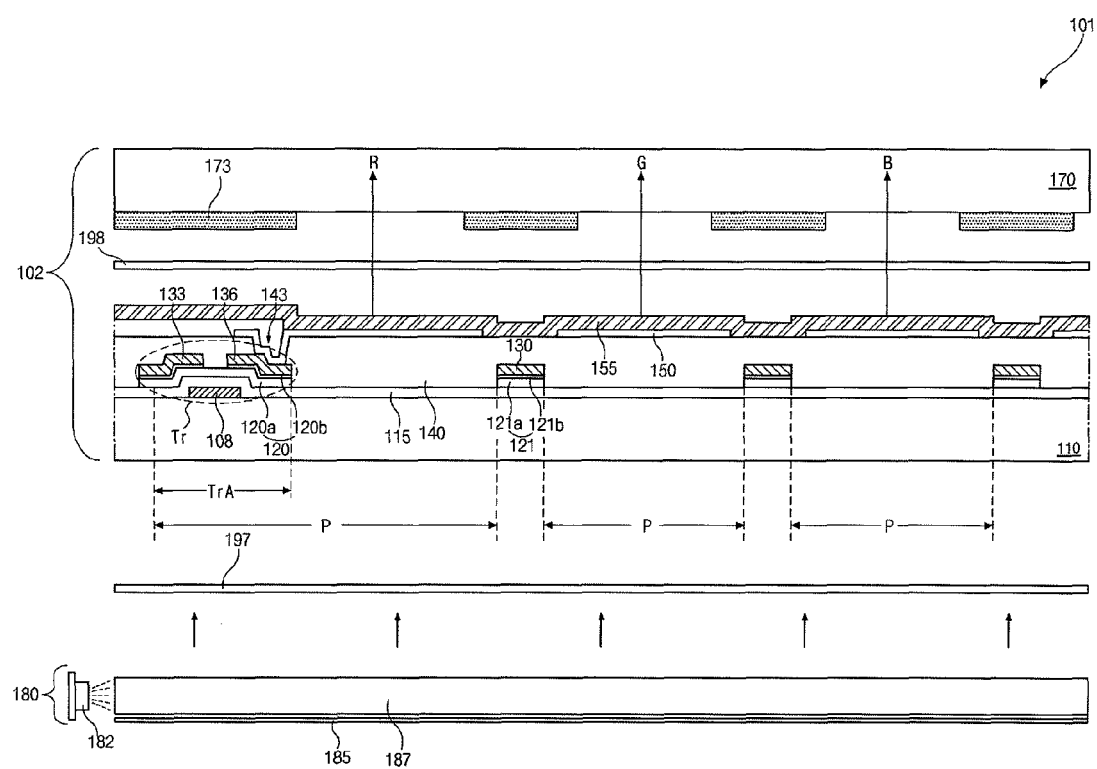
FIGS. 5A and 5B are cross-sectional views of quantum rod light-emitting display devices according to other embodiments of the invention.
Figure 5B:
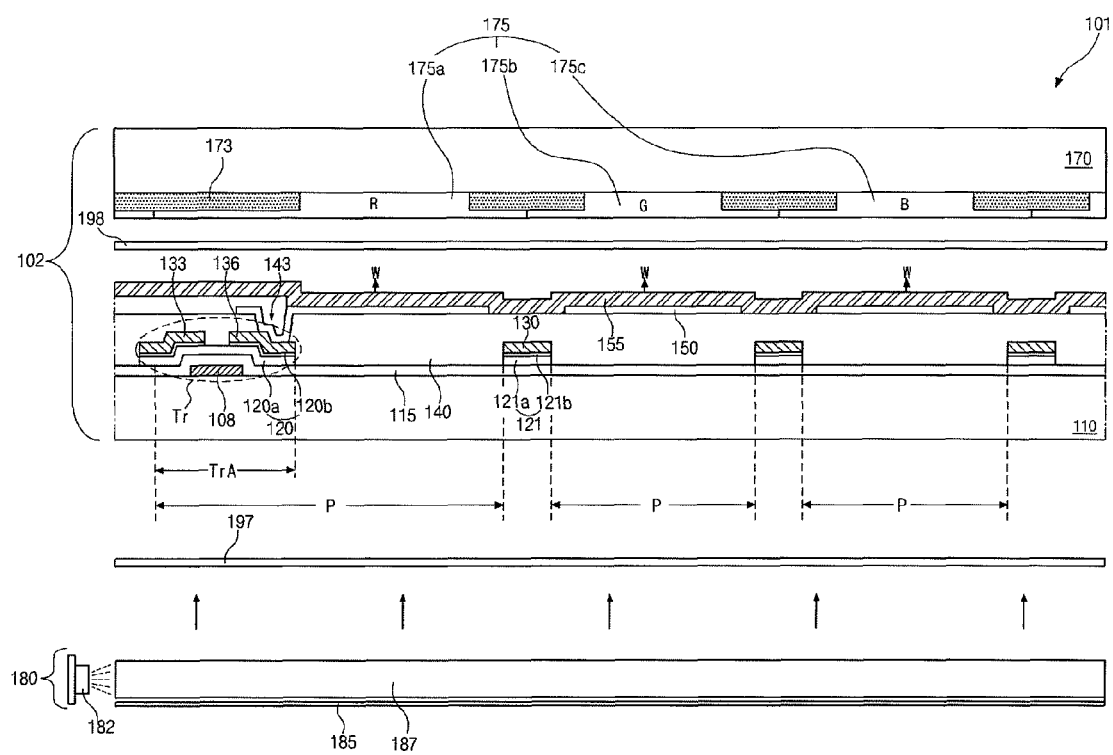
Figure 5C:
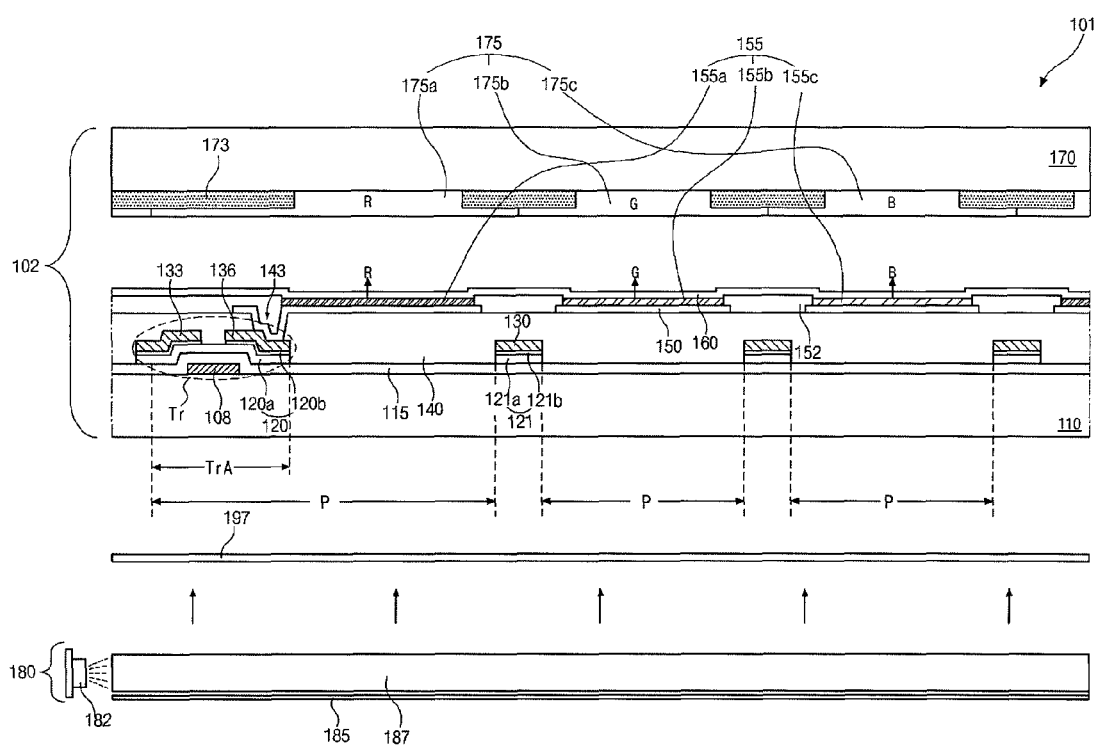
FIG. 5C is a cross-sectional view of a quantum rod light-emitting display device according to another embodiment of the invention.

FIGS. 5A and 5B are cross-sectional views of quantum rod light-emitting display devices according to other embodiments of the invention, and FIG. 5C is a cross-sectional view of a quantum rod light-emitting display device according to another embodiment of the invention.

To begin with, FIG. 4 illustrates three adjacent pixel regions P, and a thin film transistor (TFT) Tr is illustrated in only one of the pixel regions P for brevity. Also, a region including the TFT Tr in each of the pixel regions P is defined as a switching region TrA.

As shown in FIG. 4, a quantum rod light-emitting display device 101 according to an embodiment of the invention includes a quantum rod layer (or a display panel) 102 including a first electrode 150 divided into the respective pixel regions P, a second electrode 160 formed on the entire surface of a display region configured to display an image, a first substrate 110 including a quantum rod layer 155 interposed between the first and second electrodes 150 and 160, a second substrate 170 disposed opposite the first substrate 110; a BLU 180; a long-wavelength pass filter (LPF) film 198; and a short-wavelength pass filter (SPF) film 197.

In this instance, each of the SPF film 197 and the LPF film 198 may correspond to one of light-enhanced filter (LEF) films, that is, one of optical-efficiency enhancing films. Each of the SPF film 197 and the LPF film 198 may include at least one layer formed of $TiO_2$ or $SiO_2$ using a chemical vapor deposition (CVD) process.

Specifically, the SPF film 197 is formed between the quantum rod panel 102 and the BLU 180.

The SPF film 197 transmits light having a predetermined wavelength range, such as ultraviolet (UV) light or blue light emitted by the BLU 180. The SPF film 197 does not transmit visible light lost from the quantum rod layer 155, but recycles the visible light to increase light transmittance. That is, the SPF film 197 transmits light having a short wavelength and reflects light having a long wavelength.

In addition, the LPF film 198 is formed under the second substrate 170 included in the quantum rod panel 102, that is, between the second electrode 160 and the second substrate 170.

The LPF film 198 transmits the light having the visible light lost from the quantum rod layer 155. The LPF film 198 does not transmit UV light emitted by the BLU 180 but recycles the UV light to increase the efficiency of UV light. That is, the LPF film 198 transmits light having a long wavelength and reflects light having a short wavelength. In embodiments of the invention, visible light may be any visible light, including one of white light, red light, green light and blue light.

Meanwhile, in the quantum rod light-emitting display device 101 according to an embodiment of the invention, light emitted by the BLU 180 is absorbed by the quantum rod layer 155 so that electrons and holes can recombine to generate fluorescent light. Accordingly, light from the BLU 180 is used to generate light in the quantum rod layer 155. In this instance, a wavelength of the light from the BLU 180 is equal to or less than a wavelength of the fluorescent light from the quantum rod layer 155.

As described above, the quantum rod layer 155 is able to generate differently an intensity of an electric field when a voltage is applied to the first and second electrodes 150 and 160 respectively disposed under and on the quantum rod layer 155. Thus, the display device 101 displays a gray level by controlling a rate of recombination of electrons and holes in a plurality of quantum rods included in the quantum rod layer 155. Also, quantum rods 156 of the quantum rod layer 155 are formed to different sizes in the respective pixel regions P to generate red (R), green (G), and blue (B) light. Thus, the display device 101 may provide a full color range and display full-color images.

Hereinafter, construction of the first substrate 110 including the first and second electrodes 150 and 160, and the quantum rod layer 155 will be described.

Initially, the first substrate 110 is a transparent insulating substrate, for example, a substrate formed of a transparent glass material or a flexible plastic substrate.

A gate line is formed on the first substrate 110 and extends in a first direction. The gate line is formed of a metal having a low resistance, for example, one selected from aluminum (Al), an Al alloy (e.g., aluminum neodymium (AlNd)), copper (Cu), a Cu alloy, molybdenum (Mo), and a Mo alloy (e.g., molybdenum titanium (MoTi)), or at least two materials thereof. Also, a gate electrode 108 is formed in the switching region TrA of each of the pixel regions P and connected to the gate line.

A gate insulating layer 115 is formed on the entire surface of the first substrate 110 including the gate line and the gate electrode 108. The gate insulating layer 115 is formed of an inorganic insulating material, for example, silicon oxide ($SiO_2$) or silicon nitride ($SiN_x$).

A semiconductor layer 120 is formed in the switching region TrA disposed on the gate insulating layer 115 in a position corresponding to the gate electrode 108. The semiconductor layer 120 includes an active layer 120a of intrinsic amorphous silicon, and ohmic contact layers 120b of impurity-doped amorphous silicon disposed on the active layer 120a and spaced apart from each other. Source and drain electrodes 133 and 136 are formed apart from each other on the semiconductor layer 120 and contact the ohmic contact layers 120b, respectively.

In this instance, the active layer 120a is exposed between the source and drain electrodes 133 and 136 spaced apart from each other.

Thus, the gate electrode 108, the gate insulating layer 115, the semiconductor layer 120, and the source and drain electrodes 133 and 136, which are sequentially stacked in the switching region TrA, constitute a TFT Tr.

A data line 130 is formed on the gate insulating layer 115 and crosses the gate line to define a pixel region P. The data line 130 extends in a second direction and is connected to the source electrode 133 of the TFT Tr.

In this instance, although it is illustrated by example in terms of a fabrication process that a dummy pattern 121 including first and second semiconductor patterns 121a and 121b is formed of the same material as the active layer 120a and the ohmic contact layers 120b under the data line 130, but in other embodiments of the invention, the dummy pattern 121 may be omitted.

Meanwhile, although it is illustrated by example that the TFT Tr is a bottom-gate-type transistor including the semiconductor layer 120 having the active layer 120a and the ohmic contact layers 120b formed of amorphous silicon and the gate electrode 108 disposed in the lowest position in other embodiments of the invention, the TFT Tr may be a top-gate-type transistor including a semiconductor layer formed of polysilicon (poly-Si) and having a structure formed by sequentially stacking the poly-Si semiconductor layer, a gate insulating layer, a gate electrode, an interlayer insulating layer, and source and drain electrodes spaced apart from each other in contact with the poly-Si semiconductor layer. When a top-gate-type TFT is included, a gate line is provided on a gate insulating layer having a gate electrode, and a data line may be provided on an interlayer insulating layer.

A protection layer 140 having an even surface is formed on the data line 130 and the source and drain electrodes 133 and 136. In this instance, a drain contact hole 143 is formed in the protection layer 140 to expose the drain electrode 136 of the TFT Tr in each of the pixel regions P.

First electrodes 150 are formed of a transparent conductive material on the protection layer 140. Each of the first electrodes 150 is in contact with the drain electrode 136 of the TFT Tr through the drain contact hole 143 in each of the pixel regions P.

Buffer patterns 152 are formed on the first electrodes 150 and the protection layer 140 exposed between the first electrodes 150 to correspond to interfaces between the respective pixel regions P, that is, the gate line and the data line 130, and overlap edges of the first electrodes 150.

The quantum rod layer 155 including a plurality of quantum rods 156 is formed on the first electrode 150 in each of the pixel regions P surrounded with the buffer pattern 152. In this instance, the quantum rod layer 155 may include quantum rods 156a, 156b, and 156c having cores (refer to 157 in FIG. 2) with different sizes in the respective pixel regions P configured to emit red, green, and blue light. Alternatively, the quantum rod layer 155 may include quantum rods (refer to 156 in FIG. 2) having cores (refer to 157 in FIG. 2) with the same size.

In this instance, the plurality of quantum rods 156 included in the quantum rod layer 155 have major axes arranged in one direction on the entire surface of the display region of the first substrate 110. Various alignment methods may be used to align the quantum rods 156 in one direction in the quantum rod layer 155. For example, the quantum rods 156 may be aligned in one direction in the quantum rod layer 155 using any one of a voltage application method, an alignment method using an alignment film, an alignment method using a self-aligned monomer, and an alignment method using reactive mesogens. Furthermore, the alignment of the quantum rods 156 in one direction is not limited to the above-described alignment methods but may be performed using other various alignment methods.

A degree of the alignment of the major axes of the quantum rods 156 in one direction, that is, an alignment level, may be obtained by measuring a polarization ratio. After light polarized in a specific direction, for example, in a horizontal or vertical direction, is irradiated toward the quantum rod layer 155, the amount of light that has passed through an analyzer is measured to obtain a degree of polarization of the quantum rod layer 155.

Assuming that the amount of light emitted by a light source is I, light having only a horizontal component parallel to an imaginary reference line disposed parallel to the quantum rod layer 155 and extending in one direction is Ih, and light having only a vertical component normal to the reference line is Iv, when directionality is not typically given to the major axes of the quantum rods 156, that is, when an alignment process is not performed, a polarization ratio PR is defined as follows:

$PR=(Ih-Iv)/(Ih+Iv)$.

In addition, when the quantum rods 156 of the quantum rod layer 155 are arranged in one direction, that is, in a horizontal direction or vertical direction, due to an alignment process, horizontal and vertical polarization ratios PRh and PRv are defined as follows:

$PRh=Ih/(Ih+Iv)$, and $PRv=Iv/(Ih+Iv)$.

Accordingly, the alignment of the plurality of quantum rods 156 in one direction in the quantum rod layer 155 indicates that the horizontal polarization ratio PRh or the vertical polarization ratio PRv is greater than 0.5 and less than 1. That is, an inequality: 0.5<PRh or PRv<1 is satisfied.

As described above, when the quantum rods 156a, 156b, and 156c having the cores (refer to 157 in FIG. 2) with different sizes are provided in the respective pixel regions P configured to emit red, green, and blue light, the wavelength of fluorescent light varies according to the size of each of the cores (refer to 157 in FIG. 2) of the quantum rods 156a, 156b, and 156c. That is, fluorescent light having a shorter wavelength is generated with a reduction in the size of the core (refer to 157 in FIG. 2), while fluorescent light having a longer wavelength is generated with an increase in the size of the core 157.

In FIG. 4, a quantum rod layer 155a including quantum rods 156a having cores 157 with the largest size is illustrated in the red pixel region P, and quantum rod layers 155b and 155c respectively including quantum rods 156b and 156c having cores with smaller sizes than the cores 157 of the quantum rods 156a included in the red pixel region P are sequentially illustrated in the green and blue pixel regions P, respectively. However, the embodiments of the invention are not limited to the embodiment of the invention illustrated in FIG. 4.

Meanwhile, referring to FIGS. 5A and 5B, the quantum rod layer 155 is formed on the entire surface of the display region including a plurality of pixel regions P, and the buffer pattern 152 provided at each of the interfaces between the respective pixel regions P is omitted. That is, although FIG. 4 illustrates by example that the quantum rod layer 155 is divided into the respective pixel regions P, the embodiment of the invention may be modified into various other embodiments of the invention.

A second substrate 170 is formed to correspond to the first substrate 110. Like the first substrate 110, the second substrate 170 may be a transparent insulating substrate formed of a glass material or a plastic material having flexibility. Alternatively, the second substrate 170 may be a sheet or film formed of a polymer.

A black matrix 173 is formed on an inner side surface of the second substrate 170 to correspond to the interfaces between the pixel regions P and the switching regions TrA in which the TFTs are formed. In another embodiment (refer to FIGS. 5A and 5B) of the invention in which the quantum rod layer 155 is formed on the entire surface of the display region, the black matrix 173 should be formed to reduce or prevent light leakage and a mixture of colors among respective pixels. However, in other embodiments of the invention (refer to FIG. 4 and FIG. 5C) in which the quantum rod layer 155 is divided into the respective pixel regions P, the black matrix 173 may be omitted.

A black matrix may be formed between the first substrate 110 and the SPF film 197 to reduce or prevent a mixture of colors among the respective pixels.

As shown in FIG. 5C, the quantum rods (refer to 156 in FIG. 2) having the cores (refer to 157 in FIG. 2) with the same size are formed in the respective pixel regions P in the quantum rod layer 155. Also, to provide a full color range, red, green, and blue color filter patterns 175a, 175b, and 175c of a color filter layer 175 are sequentially and repetitively formed in three adjacent pixel regions P to correspond to regions surrounded with the black matrix 173. Although FIG. 4 illustrates that only the black matrix 173 is provided on the inner side surface of the second substrate 170, the embodiment of the invention may be modified into various other embodiments of the invention. Also, although the color filter layer 175 is shown as having red, green, and blue color filter patterns 175a, 175b, and 175c, in embodiments of the invention, one or more of the red, green, and blue color filter patterns 175a, 175b, and 175c may be omitted. For example, when the BLU 180 emits blue light, the blue color filter patterns 175c may be omitted.

An overcoat layer may be provided on the entire surface of the second substrate 170 over the black matrix 173 and the color filter layer 175. In one embodiment (refer to FIG. 4) in which the quantum rod layer 155 provided on the first substrate 110 includes the quantum rods 156a, 156b, and 156c having the cores (refer to 157 in FIG. 2) with different sizes in the respective pixel regions P configured to emit red, green, and blue light, a color filter layer including red, green, and blue color filter patterns disposed in the respective pixel regions P, may be further provided on the second substrate 170 to obtain a wide color reproduction range.

Meanwhile, a BLU 180 configured to supply light to the quantum rod layer 155 is formed under the quantum rod panel 102, that is, on an outer side surface of the first substrate 110. The BLU 180 includes a light source 182, a reflection plate 185, and a light guide plate (LGP) 187 mounted on the reflection plate 185.

In embodiments of the invention, the light source 182 generates light having a short wavelength range of less than about 450 nm, for example, blue visible light or UV light. That is, the light source 182 may include one selected from a fluorescent lamp including a cold cathode fluorescent lamp (CCFL) and an external electrode fluorescent lamp (EEFL) or a light emitting diode (LED). Although embodiments of the invention are illustrated as having the light source 182 include an LED, the embodiments of the invention are not limited thereto.

The light source 182 is disposed on one side of the LGP 187 opposite (or facing) a light incidence portion of the LGP 187. The LGP 187 totally reflects light incident from the light source 182 internally several times so that the light travels and uniformly spreads onto a surface of the LGP 187. The LGP 187 provides a surface light source to the quantum rod panel 102. In this instance, a pattern having a specific shape may be disposed on a rear surface of the LGP 187 to supply a uniform surface light source to the quantum rod panel 102. In this instance, the pattern having the specific shape may be variously configured with an elliptical pattern, a polygonal pattern, or a hologram pattern, to guide incident light into the LGP 187. Other patterns may also be used. The pattern may be formed on a bottom surface of the LGP 187 using a printing technique or an injection technique.

The reflection plate 185 is disposed on a rear surface of the LGP 187 and reflects light transmitted through the rear surface of the LGP 187 towards the quantum rod panel 102 to improve luminance.

Although the embodiments of the invention illustrate that the BLU 180 is an edge-type BLU in which the light source 182 is provided on a side surface of the LGP 187, and the LGP 187 allows surface light to be incident to the quantum rod panel 102, the BLU 180 may be a direct-type BLU.

In a direct-type BLU, a plurality of fluorescent lamps serving as light sources are disposed over a reflection plate at regular intervals, or an LED driver substrate in which a plurality of LEDs are disposed is provided. Also, a diffusion plate may be provided instead of the LGP 187 over the fluorescent lamps or the LED driver substrate.

Hereinafter, characteristics of an LEF film including the SPF film 197 or the LPF film 198, which is one of the most characteristic configurations of the embodiments of the invention, will be described.

Figure 6:
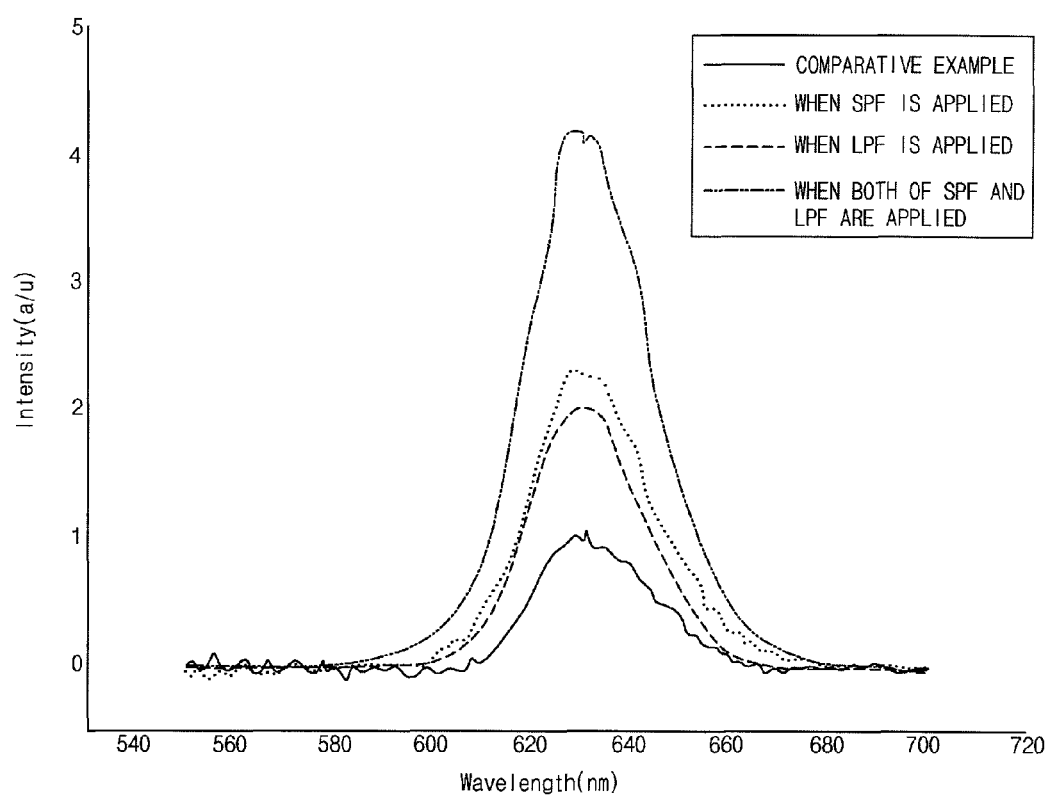
FIG. 6 illustrates characteristics of a quantum rod light-emitting display device using an optical-efficiency enhancing film according to an embodiment the invention.

FIG. 6 illustrates characteristics of a quantum rod light-emitting display device using an optical-efficiency enhancing film according to the embodiments of the invention.

Referring to FIG. 6, differences in effects of a film-free quantum rod light-emitting display device according to a comparative example and quantum rod light-emitting display devices using an SPF film, an LPF film, or both, according to embodiments of the invention were confirmed.

When light having a wavelength of about 450 nm or less was used, the results of comparing luminance and transmittance are as follows.

When an SPF film was provided under a quantum rod light-emitting display device, the quantum rod light-emitting display device exhibited about 2.1 times higher luminance and transmittance than the film-free quantum rod light-emitting display device according to the comparative example. When an LPF film was provided on a quantum rod light-emitting display device, the quantum rod light-emitting display device exhibited about 2 times higher luminance and transmittance than the film-free quantum rod light-emitting display device according to the comparative example.

Furthermore, when an SPF film and an LPF film were simultaneously and respectively formed on and under a quantum rod light-emitting display device, the quantum rod light-emitting display device exhibited about 4 times higher luminance and transmittance than the film-free quantum rod light-emitting display device of the comparative example.

Therefore, a quantum rod light-emitting display device according to embodiments of the invention includes an optical-efficiency enhancing film and can maximize the efficiency of light emitted by a BLU according to the comparative example.

According to embodiments of the invention, a quantum rod light-emitting display device can have a simpler configuration, consume less power, and exhibit higher luminance and transmittance than an LCD requiring an additional color filter layer.

Furthermore, although quantum rods having cores with only different sizes are provided to display red, green, and blue colors, a quantum rod light-emitting display device according to embodiments of the invention have no significant differences among materials, as compared with an organic light emitting diode (OLED) adopting materials having different physical properties to display red, green, and blue light. Also, the quantum rod light-emitting display device has a long lifespan because the display device maintains fluorescence for a longer duration of time than when a self-emission material is used.

According to embodiments of the invention, a quantum rod light-emitting display device includes an optical-efficiency enhancing film and can maximize the efficiency of light emitted by a BLU.

It will be apparent to those skilled in the art that various modifications and variations can be made in a display device of the invention without departing from the sprit or scope of the invention. Thus, it is intended that embodiments of the invention cover the modifications and variations of this invention provided they come within the scope of the appended claims and their equivalents.

What is claimed is:

1. A quantum rod light-emitting display device comprising:
 a display panel including a first substrate, a second substrate opposite to the first substrate, and a quantum rod layer disposed between the first substrate and the second substrate, wherein quantum rods in the quantum rod layer are arranged in one direction;
 a backlight unit provided under the display panel and configured to provide light to the display panel; and
 a short-wavelength pass filter film formed between the first substrate and the backlight unit, and configured to transmit the light from the backlight unit having a first wavelength range and to reflect light from the quantum rod layer having a second wavelength range;
 a long-wavelength pass filter film disposed between the display panel and the second substrate, and configured to reflect the light from the backlight unit having the first wavelength range and transmit the light from the quantum rod layer having the second wavelength range, wherein the first substrate is disposed closer to the backlight unit than the second substrate, and wherein a wavelength in the first wavelength range is shorter than a wavelength in the second wavelength range.

2. The quantum rod light-emitting display device of claim 1, wherein the quantum rod layer receives the light from the backlight unit and outputs visible light, and wherein the long-wavelength film reflects the light from the backlight unit, and transmits the visible light from the quantum rod layer.

3. The quantum rod light-emitting display device of claim 2, wherein the visible light is one of white light, red light, green light and blue light.

4. The quantum rod light-emitting display device of claim 1, wherein the quantum rod layer receives the light from the backlight unit and outputs visible light, and wherein the short-wavelength pass filter film reflects the visible light from the quantum rod layer.

5. The quantum rod light-emitting display device of claim 4, wherein the visible light is one of white light, red light, green light and blue light.

6. The quantum rod light-emitting display device of claim 1, wherein the light from the backlight unit is one of ultraviolet (UV) light and blue light.

7. The quantum rod light-emitting display device of claim 1, further comprising a plurality of pixel regions formed on the first substrate, each pixel region having a thin film transistor (TFT), wherein portions of the quantum rod layer are locally formed over the plurality of pixel regions, respectively.

8. The quantum rod light-emitting display device of claim 1, wherein each quantum rod includes a core, or a core and a shell.

9. The quantum rod light-emitting display device of claim 1, further comprising:

a plurality of first electrodes locally formed on the first substrate;

a buffer pattern locally formed between adjacent first electrodes; and a second electrode formed on the plurality of first electrodes and on the buffer pattern, wherein the quantum rod layer is disposed locally between the plurality of first electrodes and the second electrode.

10. The quantum rod light-emitting display device of claim 1, further comprising:

a protection layer formed on the first substrate; and a plurality of electrodes locally formed on the protection layer, and exposing portions of the protection layer, wherein the quantum rod layer is disposed on the plurality of electrodes and on the exposed portions of the protection layer.

11. The quantum rod light-emitting display device of claim 1, further comprising a black matrix patterned on the second substrate.

12. The quantum rod light-emitting display device of claim 11, further comprising a color filter layer formed on the second substrate, and including red, green, and blue color filter patterns.

13. The quantum rod light-emitting display device of claim 1, wherein the quantum rod layer receives the light from the backlight unit and outputs visible light of different colors depending on different sizes of the quantum rods.

14. The quantum rod light-emitting display device of claim 1, wherein the second substrate is formed of one of a plastic material, a polymer, and glass.

* * * * *